March 3, 1970 P. B. WEST ET AL Re. 26,807

COILERS

Original Filed Oct. 1, 1964

United States Patent Office

Re. 26,807
Reissued Mar. 3, 1970

26,807
COILERS

Paul B. West, Clemson, and Richard J. Savageau, Seneca, S.C., assignors to Maremont Corporation, Chicago, Ill., a corporation of Illinois Original No. 3,334,385, dated Aug. 8, 1967, Ser. No. 400,669, Oct. 1, 1964. Application for reissue July 22, 1968, Ser. No. 753,807
Int. Cl. D01g *31/00;* D04h *11/00*
U.S. Cl. 19—.2 12 Claims

Matter enclosed in heavy brackets [ ] appears in the original patent but forms no part of this reissue specification; matter printed in italics indicates the additions made by reissue.

*ABSTRACT OF THE DISCLOSURE*

*A sliver rupturing device for a textile coiler including a snubbing comb mounted adjacent the path of the sliver passing from the coiler's delivery rolls, and a laterally-movable arm for deflecting the sliver into snubbing engagement with the comb and rupturing it between the comb and the delivery rolls. The spacing of the arm from the comb and the rolls insures that the sliver break occurs at a desired location facilitating the subsequent resumption of coiling operations. Also disclosed is a stop-motion responsive to sliver chokes between the coiler's delivery rolls and tube gear.*

The present invention relates to improvements in coilers, and more particularly to a mechanism for rupturing the sliver or similar short fiber strand material in process of being coiled, and simultaneously for positioning the leading end of the ruptured sliver in position for continued feed.

It is a principal object of the invention to provide a novel sliver rupturing device for use in a coiler, which acts automatically when rendered operative to effect a clean break of the feeding sliver so that the trailing end severed with the coil is drawn into the can, and the severed end of the sliver leading from supply is accurately positioned to be advanced certainly and accurately into a substituted can whenever feed of the sliver is resumed.

It is a further object of the invention to provide a novel and improved detector device associated with the rupturing device herein set forth which will operate in a simple and effective manner to detect any obstruction to the sliver feed which may occur in that portion of the apparatus located between the tube gear of the coiler and the delivery rolls through which the sliver is fed to said tube gear.

With these and other objects in view as may hereinafter appear, the several features of the invention will be readily appreciated by one skilled in the art from the following description taken in connection with the accompanying drawings, in which.

Figure 1:
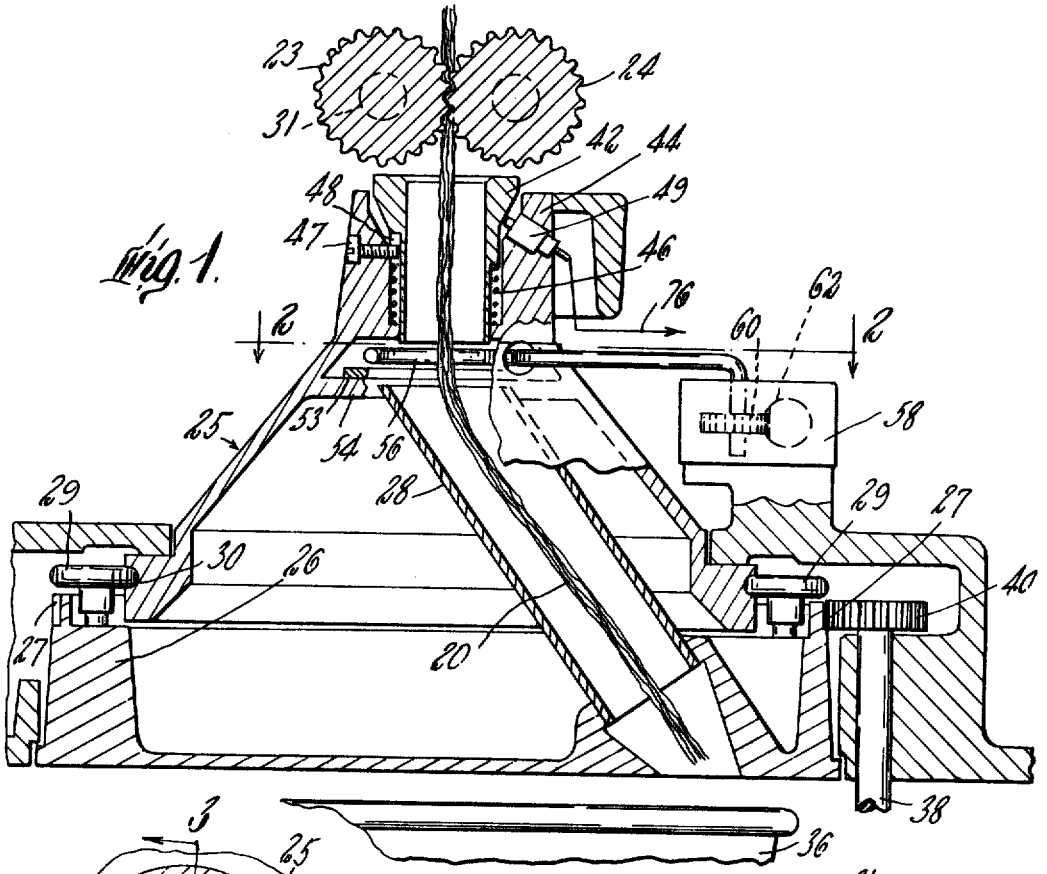
FIG. 1 is a fragmentary large scale vertical section taken through a coiler for delivering sliver to a can, illustrating particularly the tube gear carrying the inclined tube for delivering sliver in coiled form to a can, portions of the mechanism for feeding sliver thereto, the sliver disrupting device, and including the sliver feed obstruction detector device associated therewith.

The invention is herein disclosed as embodied in a coiler for coiling sliver and like material in cans, only so much of the apparatus being shown as believed necessary to illustrate the connection of the invention therewith. The coiling apparatus is in general similar to that shown, for example, in the patent to P. B. West et al., No. 2,983,-967, in which sliver 20 is delivered by delivery rolls 23, 24 supported on a fixed coiler head 25 directly over a conventional tube gear 26 having external gear teeth 27 and carrying an inclined tube 28 rotatable on a vertical axis on bearings provided by wheels 29 supported on the tube gear 26 for engagement in an annular groove 30 formed in the coiler head 25.

Figure 4:
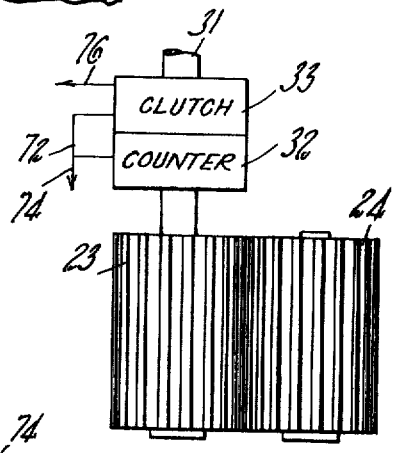
FIG. 4 is a detail plan view of the delivery rolls of FIG. 1, and including a clutching device through which said rolls are driven and a predetermined yardage counter for measuring the sliver delivered.

The delivery rolls 23, 24, best shown in FIG. 4, are preferably fluted intermeshing rolls, one of which is conventionally driven from a drive shaft 31 forming part of the coiler device, not here shown. For purposes of the present disclosure, an electrically operated clutch diagrammatically shown at 33 and a predetermined yardage counter 32 have been interposed between the drive shaft 31 and the delivery roll 23. The inclined tube 28 is formed with the mouth portion thereof centered directly beneath the delivery rolls 23, 24 and with the orifice through which the sliver is discharged to a can 36, offset radially from the axis of rotation of the tube gear.

The tube gear 26 is driven through driving connections which may be conventional and include, for driving the conventional can turntable, a vertically disposed drive shaft 38 and a pinion 40 secured to the upper end thereof, which meshes with the peripheral teeth 27 of the tube gear.

In the preferred construction as shown, a vertically disposed tube 42 is mounted directly beneath the delivery rolls 23, 24 through which the sliver 20 is fed directly into the mouth of the inclined tube 28. The vertically disposed tube 42 forms an essential element of our sliver disrupting device, and also forms part of a detector device which will detect and will be suitably activated by the occurrence of any obstruction in the feed of sliver to the inclined tube gear 26. As best shown in FIG. 1, the tube 42 is loosely supported within a sleeve 44 in the fixed coiler head 25 and is normally held in a raised position relative thereto by means of a compression spring 46 seated at its lower end against a shoulder portion of the sleeve 44 and at its upper end against a shoulder formed in the external periphery of the tube 42. Movement of the tube is limited by the stop screw 47 mounted in the sleeve 44 for engagement in a slot 48 in the peripheral surface of the tube 42. Downward movement of the tube 42 causes an outwardly shouldered upper end portion thereof to engage and to actuate a microswitch 49. In the event that sliver should become jammed or back up in the tube 42, the tube will be automatically moved downwardly by additional sliver delivered by the calender rolls causing the microswitch 49 to operate. The detector device thus provided is advantageously employed to arrest the operation of the machine, as, for example, by disconnecting clutch 33 to stop the delivery rolls 23, 24.

Elements of my improved sliver disrupting device include additionally a sliver flow impeding element in the form of a comb 53, which is secured to an inwardly projecting flange 54 of the coiler head 25 to extend transversely adjacent one edge and immediately above the inlet opening of the inclined tube 28, and a hook 56 which is arranged to swing laterally in a horizontal plane immediately beneath the lower end of the tube 42 and above the comb 53. The hook 56 comprises a wire member having at one end a downward extension which is fitted into a bearing formed in a block 58 mounted on the coiler head 25 and provides a pivot support about which the hook swings. A segmental gear 60 secured to the pivoting portion of the hook 56 is arranged for engagement with a rack 62 slidably supported in a bore in the block 58. A coiled compression spring 63 seated within the bore referred to and engaging one end of the rack 62 normally holds the rack, segmental gears 60 and swinging hook 56 in the retracted inoperative position shown in FIG. 2. The hook is adapted to be swung across the inlet opening of the upper end of the inclined tube 28 and over the comb 53 to engage and to disrupt the sliver 20 by means of operating connections which include an electrically operated air valve 64 connected with a piston 66 which is formed integrally with the rack 62. The swinging movement of the hook 56 induced by the operation of the air valve 64 and rack 62 causes a bight of sliver 20 to be taken and moved laterally as shown in FIG. 3, the lower edge thereof engaging against the teeth of the comb 53, the comb acting as a heavy friction snub to prevent movement of this portion of the sliver. The movement of the hook 56 thus has the effect of stretching that portion of the sliver extending between the nip of the calender rolls 23. 24 and the friction snub on the sliver produced by the engagement of the teeth of the comb 53 thereagainst. Inasmuch as this distance is substantially greater than the length of any individual fiber in the sliver, the stretch thus imposed upon this portion of the sliver causes the sliver to be disrupted.

Figure 2:
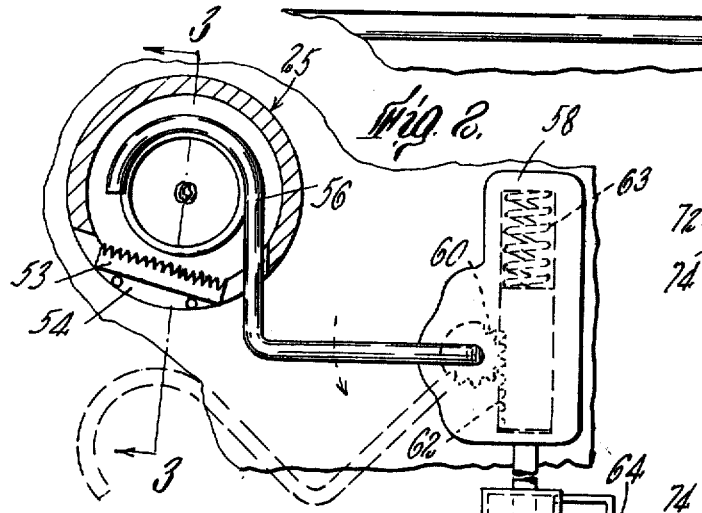
FIG. 2 is a sectional plan view taken on a line 2—2 of FIG. 1 illustrating particularly elements of the sliver disrupting device.
Figure 3:
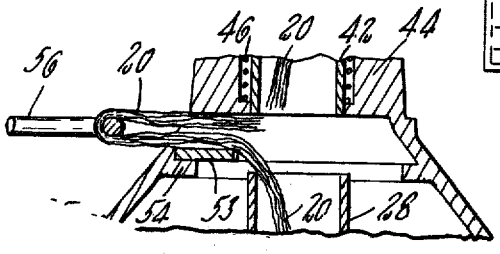
FIG. 3 is a detail sectional view taken on a line 3—3 of FIG. 2 illustrating the operation of the sliver disrupting device.

Conventionally arranged electrical connections between the counter 32, clutch 33 and air valve 64, and between the microswitch 49 and the clutch 33 are diagrammatically indicated in FIGS. 1, 2 and 4 of the drawings. As shown in FIG. 4 the counter 32 when actuated closes a circuit through a wire 72 to the electrically operated clutch causing the clutch to open, and closes a second circuit through lead 74 indicated in FIG. 4 and in FIG. 2 to the electrically controlled air valve 64 causing the hook 56 to operate. The micro-switch 49 when actuated closes a circuit to the clutch 33 through a wire 76 shown in FIGS. 4 and 1 causing the clutch to open.

The operation of our improved sliver disrupting device will be described more particularly as follows:

It is assumed that the completion of a coiling operation has been signaled as, for example, by the operation of the conventionally shown electric counter 32. The rotation of the calender rolls 23, 24 is now arrested or greatly reduced as, for example, by the operation of the electrically operated clutch 33 energized through the electric circuit 72.

The electrically operated valve 64 is now energized through electric circuit 74 to swing the hook 56 to the sliver disrupting position shown in dotted lines in FIG. 2 and in full lines in FIG. 3 causing a length of sliver extending between the arrested calender rolls 23, 24 and the high friction snub produced by the teeth of the comb 53 to be substantially stretched. The held length of sliver 20 is thus stretched to the disrupting point at which the relatively short lengths of fiber are pullled away from one another producing the break in the sliver shown in FIG. 3. The hook immediately returns to its normal position. The lower of the two sliver ends produced by the sliver severing operation is drawn downwardly into the filled can upon removal of the can, while the upper end of the severed sliver leading from supply is left suspended in the vertically arranged tube 44.

The apparatus described has the advantage that it produces a clean break in the sliver and leaves a hanging end thereof which is positioned within the vertical tube 44, so located that when the feeding of the sliver is resumed the free end will automatically be fed downwardly through the vertical tube 44, the connecting sloping tube 28, and finally into a can selected to receive said fibers.

The tube 42 is of such length with relation to the length of the individual short fibers of the sliver and the relative positions and proportions of the various elements are such that the severing of the sliver must occur without fail in the upper tube 42. The orderly rupture of the strand and its vertical orientation in the tube insures that the sliver strand will be self-threading through a lower inclined tube when the calender rolls 23, 24 resume their rotation. Satisfactory operation of the sliver severing device is made possible principally by the use of the vertical tube section preceding the swinging hook, and by the use of the high friction snubbing surface provided by the comb 53 directly below the hook, to prevent withdrawal of sliver from the inclined tube and so to cause the rupture to occur where desired.

It will be readily appreciated that circumstances may occur in which the severed end or [more] *some* following portion of the sliver may become bunched up or otherwise entangled in the vertical tube 42 with the result that the normal fed of the sliver is obstructed with the risk of damage to the apparatus. In such case the tube 42 will be forced downwardly against the spring 46 causing the micro-switch to operate closing the circuit through wire 76 to the clutch 33, which is immediately disconnected to stop the fed of delivery rolls 23, 24.

The invention having been described what is claimed is:

1. In a coiler having a pair of delivery rolls having a sliver feeding nip [providing a sliver delivery path therebeneath], control means for controlling the rotation of said delivery rolls to arrest the fed of sliver therebetween, *and a sliver delivery tube; means providing a sliver delivery path between the nip of said delivery rolls and said sliver delivery tube;* sliver severing means comprising sliver deflecting means including an arm mounted below said delivery rolls for swinging movement in a horizontal plane from an inoperative position at one side of the path of sliver delivery to an operative position adjacent the opposite side of said path to deflect said sliver toward said opposite side, sliver snubbing means including a sliver flow impeding element mounted below said sliver deflecting means on said opposite side of said path, and operating means moving said sliver deflecting means from its inoperative to its operative position to deflect said sliver from said path into snubbing contact with said sliver flow impeding element, said operating means operating upon the reduction of feed of sliver by said control means to disrupt said sliver between said delivery rolls and said sliver flow impeding element.

2. In a coiler [, a sliver severing means] according to claim 1, *wherein said means providing said sliver delivery path comprises* [in which there is provided] a vertically disposed sliver feed tube extending from beneath said rolls downwardly to a point above said sliver deflecting means, said tube having a length so related to the length of individual fibers of said sliver that the severed end of the feeding sliver will be located within said vertical tube.

3. In a coiler, sliver severing means according to claim 1 in which the sliver snubbing means comprises a high friction toothed comb for frictionally engaging the deflected sliver.

4. In a coiler [, a sliver severing means according to claim 1 having] *according to claim 1, wherein said means providing said sliver delivery path comprises* a vertically arranged fed tube extending from beneath said delivery rolls to a point immediately above said sliver deflecting means, and [a] *said* sliver snubbing means comprising a transversely disposed toothed comb mounted below said sliver deflecting means and above said delivery tube for snubbing and frictionally impeding the snubbed sliver.

5. In a coiler having sliver severing means according to claim 1, *wherein said means providing said sliver delivery path comprises* [in which there is provided] a vertically disposed sliver fed tube extending from beneath said rolls downwardly to a point above said sliver deflecting means, a support on which said feed tube is movable longitudinally, means biasing said fed tube longitudinally upwardly toward said rolls, and an operating device arranged to be actuated by a downward movement of said fed tube against said bias upon the occurrence of an obstruction of said feeding sliver within the feed tube.

6. In a coiler as claimed in claim 1, further including a stop motion *wherein said means providing said sliver delivery path comprises* [comprising] a vertically movable tube mounted between said delivery rolls and said sliver deflecting means surrounding said path, yieldable means normally maintaining said vertically movable tube in a predetermined position, and switch means responsive to movement of said tube occurring upon plugging of said tube, said control means being responsive to said switch means to stop said delivery rolls.

*7. In a coiler having a pair of delivery rolls and a sliver delivery tube; means providing a sliver delivery path between said feed rolls and said delivery tube; sliver severing means comprising sliver flow impeding and snubbing means mounted below the delivery rolls and above said delivery tube in spaced adjacent relationship to said path of sliver delivery, and sliver deflecting means movable from inoperative to operative position across said path of sliver delivery intermediate the delivery rolls and said snubbing means for deflecting the sliver from said path of delivery thereof into snubbing contact with said snubbing means and for rupturing the snubbed sliver between the delivery rolls and said snubbing means.*

*8. In a coiler as in claim 7, wherein said sliver deflecting means when in said operative position thereof is located closer to said snubbing means than to said delivery rolls.*

*9. In a coiler as in claim 7, wherein said sliver deflecting means comprises a blunt hook-shaped member.*

*10. In a coiler as in claim 7, wherein said snubbing means comprises a toothed comb, and wherein said sliver deflecting means when in said operative position thereof is disposed closely adjacent said comb and relatively distal from said delivery rolls.*

*11. In a coiler as in claim 10, wherein said sliver deflecting means comprises a blunt member.*

*12. In a coiler as in claim 10, including control means for controlling the rotation of said delivery rolls to arrest the feed of sliver therebetween, and operating means for imparting said movement to said sliver deflecting means upon arresting by said control means of the feed of sliver between said delivery rolls.*

References Cited

The following references, cited by the Examiner, are of record in the patented file of this patent or the original patent.

UNITED STATES PATENTS

| | | | |
|---|---|---|---|
| 255,473 | 3/1882 | Tatham | 19—159 |
| 3,083,416 | 4/1963 | Hashimoto | 19—159 |
| 3,084,399 | 4/1963 | Juillard | 19—157 |
| 704,704 | 7/1902 | Meats et al. | 19—23 |
| 3,083,416 | 4/1963 | Hashimoto | 19—159 |

FOREIGN PATENTS

| | | |
|---|---|---|
| 897,776 | 5/1962 | Great Britain. |
| 271,870 | 6/1913 | Germany. |
| 888,819 | 7/1953 | Germany. |

DORSEY NEWTON, Primary Examiner

U.S. Cl. X.R.

19—.23, 159